United States Patent Office

3,646,030
Patented Feb. 29, 1972

3,646,030
METHOD FOR THE PREPARATION OF BASIC DERIVATIVES OF 9-OXO-10-OXA-9:10-DIHYDROANTHRACENE
Davide Milani, Milan, Italy, assignor to Mondi Pharma Establishment, Vaduz, Liechtenstein
No Drawing. Filed Mar. 25, 1969, Ser. No. 810,373
Int. Cl. C07d 87/34
U.S. Cl. 260—247.7 F        3 Claims

ABSTRACT OF THE DISCLOSURE

A few basic derivatives of 9-oxo-10-oxa-9:10-dihydroanthracene are disclosed, which have an intense stimulating effect on respiration. A method for the preparation of these compounds is also disclosed and mainly consists in the reaction of an N-halogen succinimide with 4-methyl-9-oxo-10-oxa-9:10-dihydroanthracene which has been substituted in the 3 position by a selected substituent.

---

This invention relates to a grouping of basic derivatives of 9-oxo-10-oxa-9:10-dihydroanthracene having a powerful pneumokinetic action which renders them particularly suitable for treating depressive respiratory states of various origin and nature.

These compounds can be encompassed by the general formula

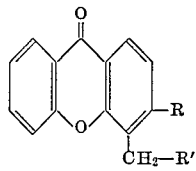

wherein R is a substituent selected from the group consisting of —OH, —OCH$_3$, —Cl, —F, —CF$_3$, —NO$_2$, —NH$_2$, —COCH$_3$; and R' is a radical selected from the group consisting of:

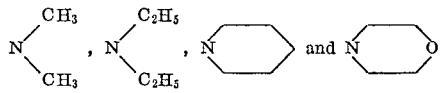

As a matter of fact, it has been surprisingly ascertained that the biological activity of these compounds is conditioned by a precise arrangement of the substituents R and R', as will more clearly appear from the pharmacological tests reported hereinafter.

It has been ascertained, moreover, that with the method according to the present invention, as will be more detailedly set forth hereinafter, such specific arrangements of the substituents R and R' can be obtained by excluding the possibility of the formation of isomers.

A further and considerable advantage of the method of the present invention is that at the end of it the reactants can be recycled, a remarkable simplification and economy of both the procedure and the installation being thus achieved.

More particularly, the method according to the present invention consists in selectively halogenizing, with an N-halogen-succinimide, a 4-methyl-9-oxo-10-oxa-9:10-dihydroanthracene which has been substituted in the "3" position by a substituent R as set forth above, recovering the N-succinimide obtained as a residue, condensing the halogenized intermediate with a secondary amine selected from the group consisting of dimethylamine, diethylamine, piperidine, and morpholine reconstituting the N-halogen succinimide to be recycled in the first stage of the method.

In order that the inventive method may be best illustrated and elucidated, a few particular examples will now be given.

EXAMPLE 1

(A) 3-methoxy-4-bromomethyl-9-oxo-10-oxa-9:10-dihydroanthracene 3.4 grams of 3 - methoxy-4-methyl-9-oxo-10-oxa-9:10-dihydroanthracene (J. Org. Chem. 27, 1215 (1962)) in 30 mls. of CCl$_4$ are supplemented by 1 gram of N-bromo succinimide and by a knife point of benzoyl peroxide and refluxed for one hour. The separated N-succinimide is collected on a filter from the hot liquor and the filtrate is evaporated to dryness. The residue is crystallized from ethyl acetate and 1.8 grs. of a white solid are obtained, which melt at 228° C–230° C.

Analysis for C$_{15}$H$_{11}$BrO$_3$.—Br. (percent): Found, 24.35; calcd., 25.04.

(B) 3-methoxy-4-piperidinomethyl-9-oxo-10-oxa-9:10-dihydroanthracene 3.2 grs. of 3 - methoxy-4-bromomethyl-9-oxo-10-oxa-9:10-dihydroanthracene, as obtained at (A), in 50 mls. benzene are supplemented by 1.7 grs. piperidine and refluxed for 4 to 6 hours. The product is placed in a separatory funnel and washed several times with water: the benzene extract, upon drying, is evaporated and the residue is crystallized from ethyl acetate. 2.9 grs. of a white products are obtained, which melt at 148° C–150° C.

Analysis for C$_{20}$H$_{21}$NO$_3$.—N (percent): Found 4.27; calcd., 4.33.

From this compound there have been prepared, with usual procedures, the following water soluble salts, which are adapted for preparing, with simple and conventional methods, formulations, for example in ampoules or in drops, useful for administration as medicaments.

Hydrochloride.—A white crystalline solid (from ethanol) without any characteristic melting point (over 200° C. with decomposition).

Analysis for C$_{20}$H$_{22}$ClNO$_3$.—Found (percent): Cl, 9.81—N, 3.70. Calcd. (percent): Cl, 9.85—N, 3.89.

Acidic tartrate.—A white crystalline solid (from ethanol), without any characteristic melting point (over 200° C., dec.).

Analysis for C$_{24}$H$_{27}$NO$_9$.—N (percent): Found, 3.00; calcd., 2.94.

Dihydrogen phosphate: A white crystalline solid (from ethanol) with one molecule of crystallization alcohol and without any characteristic melting point (over 200° C., dec.).

Analysis for C$_{20}$H$_{24}$NPO$_7$—C$_2$H$_5$OH.—Found (percent): C, 56.60; H, 6.30; N, 3.00. Calcd. (percent): C, 56.55; H, 6.46; N, 2.99.

Acetate.—A white crystalline solid (from alcohol and ether), without any characteristic melting point.

Analysis for C$_{22}$H$_{25}$NO$_5$.—Found (percent): C, 68.89; H, 6.51; N, 3.33. Calcd. (percent): C, 68.92; H, 6.57; N, 3.33.

EXAMPLE 2

3-methoxy-4-diethylaminomethyl-9-oxo-10-oxa-9:10-dihydroanthracene

With the procedure of Example 1, 3.2 grs. of 3-methoxy-4-bromomethyl - 9 - oxo-10-oxa-9:10-dihydroanthracene (obtained from (A), Ex. 1) and 1.5 grs. diethylamine, give 2.8 grs. of a crystalline product (from ethyl acetate) having a M.P. of 101° C.–102° C.

Analysis for C$_{19}$H$_{21}$NO$_3$: N (percent): Found, 4.50; calcd., 4.51.

EXAMPLE 3

(A) 3-hydroxy-4-bromomethyl-9-oxo-10-oxa-9:10-dihydroanthracene 2.26 grs. of 3-hydroxy-4-methyl-9-oxo-10-oxa-9:10-dihydroanthracene in 30 mls. CCl$_4$ are supplemented by 1 gr. of N-bromosuccinimide and a knife point of benzoyl peroxide, then refluxed during one hour. The separated N-succinimide is separated by filtration from the hot liquor and the filtrate is evaporated to dryness. The residue is crystallized from ethyl acetate and one obtains 1.9 grs. of a white solid having a M.P. of 270° C.–273° C.

Analysis for $C_{14}H_9BrO_3$.—Br (percent): Found, 26.10; calcd., 26.19.

(B) 3-hydroxy-4-piperidinomethyl-9-oxo-10-oxa-9:10-dihydroanthracene 3.05 grs. of 3-hydroxy-4-bromomethyl-9-oxo-10-oxa-9:10-dihydroanthracene (obtained in A) in 50 mls. benzene are supplemented by 1.7 grs. piperidine and refluxed during 4 to 6 hours. The mixture is transferred to a separatory funnel and washed several times thoroughly with water: the benzene extract, upon drying, is evaporated and the residue is crystallized from ethyl acetate. One thus obtains 2.7 grs. of white crystalline solid having a M.P. of 152° C.–153° C. (from alcohol).

Analysis for $C_{19}H_{19}NO_3$.—N (percent): Found, 4.48; calcd., 4.53.

EXAMPLE 4

3-hydroxy-4-diethylaminomethyl-9-oxo-10-oxa-9:10-dihydroanthracene 3.05 grs. of 3-hydroxy-4-bromomethyl-9-oxo-10-oxa-9:10-dihydroanthracene (obtained in A, Ex. 3) and 1.5 grs. diethylamine give, with the method of Example 1, 2.5 grs. of a white crystalline product having a M.P. of 200° C.–201° C. (from ethyl acetate).

Analysis for $C_{18}H_{19}NO_3$.—N Found (percent): 4.71; calcd. 4.70.

In order that the properties of the compounds according to the present invention may be best understood, the results of a few pharmacological tests will be reported hereinafter. In the tests, the products concerned have been preferably used in the form of hydrochlorides and acetates.

(1) TOXICITY (a) Acute toxicity

It has been determined on white mice by calculating the $LD_{50}$ according to the Weil method (Biometrics, 8, 249, 1952) with an observation time of seven days.

The results are tabulated in Table 1 below, wherein also the $CD_{50}$ (convulsant dose in 50% of animals) data have been reported along with the R index (ratio of $LD_{50}$ to $CD_{50}$). In addition, in the table, the symbols: i.p., oral and s.c. indicate the respective routes of administration, that is, intraperitoneal, oral and subcutaneous, respectively. The tabulated data are referred to the hydrochlorides of the individual compounds.

TABLE 1

| Compound | $LD_{50}$ mg./kg. | | $CD_{50}$ mg./kg. | R |
|---|---|---|---|---|
| (1) 3-methoxy-4-piperidinomethyl-9-oxo-10-oxa-9:10-dihydroanthracene. | I.p. | 70.73 | 57.8 | 1.2 |
|  | Oral | 190 | 144 | 1.3 |
|  | S.c. | 71.4 | 54.5 | 1.3 |
| (2) 3-methoxy-4-diethylamino-methyl-9-oxo-10-oxa-9:10-dihydroanthracene. | I.p. | 49.06 | 44.6 | 1.1 |
|  | Oral | 130 | 107 | 1.2 |
|  | S.c. | 50 | 380 | 1.3 |
| (3) 3-hydroxy-4-piperidinomethyl-9-oxo-10-oxa-9:10-dihydroanthracene. | I.p. | 200 | 125 | 1.6 |
|  | Oral | 550 | 423 | 1.3 |
|  | S.c. | 222 | 158 | 1.4 |
| (4) 3-hydroxy-4-diethylamino-methyl-9-oxo-10-oxa-9:10-dihydroanthracene. | I.p. | 225 | 172 | 1.3 |
|  | Oral | 600 | 390 | 1.5 |
|  | S.c. | 318 | 204 | 1.5 |

It can be seen from the table that the R index has values whose order of magnitude can be compared with that reported for typical brain stem analeptics such as "bemegride," "picrotoxyn," "leptazol," "dimefline," values which, in point of fact, are comprised between 1.2 and 2.2 (Setnikar I, et al.: J. Pharmacol. Exper. Ther., 128, 176, 1960).

(b) Chronic toxicity

For the chronic toxicity tests, there are described herein, by way of example, those performed on the compound of Example 1. To do so, 40 young rats (20 males and 20 females) have been selected and every day a dosage corresponding to one tenth of the $LD_{50}$ has been administered orally. The test has been continued for 180 days in comparison with control untreated rats, the weight gain, the blood composition and the analytical data on blood and urine of the treated animals did not show any statistically appreciable differences between the treated and the untreated animals. Likewise, no appreciable differences in the weight of the different organs in the two groups have been ascertained and the histological tests did not show any evidence of lesions.

(2) CENTRAL STIMULATING ACTIVITY

In toxic dosages, the compounds of the present invention cause clonic convulsions in the mice, sometimes followed by tonic extensions.

More particularly, the paroxysmal excitation of the central nervous system are the principal death cause for the intoxicated animals so that the $LD_{50}$ itself is, under this particular respect, an index of the stimulating activity of these compounds.

(3) ANALEPTIC ACTIVITY (a) Antagonism against the toxicity due to sodium pentobarbital Once the $LD_{99}$ of the latter has been determined, 45–60 minutes after the administration by the intraperitoneal route (130–140 mg./kg.), it has been injected simultaneously with an amount thrice the $LD_{50}$ of the compounds of the invention, by the subcutaneous route, to groups of 20 mice.

After 24 hours an average survival rate of 75% has been ascertained (15 mice out of 20).

(b) Reduction of sleeping time of mice anesthetized with sodium pentobarbital

This test has been performed on mice according to the method by Weaver, L. C., and co-workers (J. Pharmacol. Exptl. Ther., 116, 268, 1956) and consisted in determining the amount by which the awakening time is shortened as a consequence of the subcutaneous administration of the $LD_{50}$ of the analeptic 20 minutes after an intraperitoneal treatment with sodium pentobarbital. The results have been compared with those of "leptazol" and are reported in Table 2, wherein A. R. is the analeptic ratio, that is:

$$A.\ R. = \frac{\text{Duration of hypnosis in rats treated with analeptic}}{\text{Duration of hypnosis in rats non treated with analeptic}}$$

TABLE 2

| | Sodium pentobarbital | | | |
|---|---|---|---|---|
| Compound | 50 mg./kg. | A.R. | 65 mg./kg. | A.R. |
| Control (saline) | 80' | ------ | 167' | ------ |
| "leptazol" (90 mg./kg.) | 22' | 0.27 | 70' | 0.42 |
| 1* hydrochloride | 33' | 0.41 | 86' | 0.51 |
| 2* hydrochloride | 46' | 0.57 | 89' | 0.53 |
| 3* hydrochloride | 80' | 1.00 | 155' | 0.92 |
| 4* hydrochloride | 76' | 0.95 | 172' | 1.03 |

*Corresponding to the compounds indicated by the same number in Table 1.

(c) Pneumokinetic activity in the respiratory depression caused by morphine

The tests have been performed on rabbits (2–3 kgs.) by recording the arterial pressure and breath with the convention techniques. Since the chloralosic and urethanic anesthesias were such as to disturb the evaluation of the analeptic activity, the tests have been performed on non anesthetized animals according to the method by Bargeton, D. and coworkers (Arch. int. Pharmacodyn., 101;

416, 1955): there has been measured the antagonism exerted by the compound tested on the respiratory depression caused by the intravenous administration of 10 mg./kg. of morphine hydrochloride.

30 minutes after the morphine injection, the compound to be tested has been injected intravenously.

Table 3 indicates the equiactive doses in mg./kg. by intravenous route ($ED_{50}$ ev.) in comparison with dimefline and the therapeutic indexes $$\left(T.I. = \frac{DL_{50} \text{ intraperitoneally in mice}}{ED_{50} \text{ intravenously in rabbits}}\right)$$

TABLE 3

| Compound | $ED_{50}$ intrav. (mg./kg.) | Therapeutic index |
|---|---|---|
| Dimefline | 0.48 | 10.0 |
| 1 (hydrochloride) | 3.4 | 20.8 |
| 2 (hydrochloride) | 2.7 | 18.2 |

It can thus be seen that the therapeutic index of the compounds of the present invention, especially the compound No. 1 (3-methoxy-4-piperidinomethyl-9-oxo-10-oxa-9:10-dihydroanthracene) is very high and is the double of that of dimefline, which had been considered hitherto the analeptic having the highest therapeutic index.

In addition, the compound No. 1, at dosages up to 8 mg./kg. intravenously in unanesthesized rabbits, does not give rise to any significant changes in blood pressure, nor does not alter the pressuer response to adrenaline and acetylcholine. No variations in the cardiac frequency or in the ECG patterns are recorded.

From this point onwards the results of the biological tests are referred to the compound No. 1 (hydrochloride).

(4) INVESTIGATIONS ON THE CUMULATION OCCURRENCE

The administration to mice, by the intraperitoneal route, of ⅔ of the $LD_{50}$ every 6 hours for 10 consecutive times did not cause any toxicity increase.

Under the same conditions, with a dosage equal to ⅘ of the $LD_{50}$, even though tonic-clonic attacks have been frequently observed from 5 to 10 mins after each administration, it has been observed that only 50% of the animals (10 out of 20) died between the 4th and the 10th administration.

(5) METABOLISM

The tests have have been performed on rabbits, by thin layer chromatographic analysis (Kieselgel G) of urines collected at various time intervals within a 24-hours from administration. The eluant mixtures were:

cyclohexane/diethylamine 90:10
cyclohexane/acetone/diethylamine 12.5:10:2.5

The results are tabulated in Table 4 below

TABLE 4

| Administration route | Dosage (mg./kg.) | Unmodified compound No. 1 percentage |
|---|---|---|
| Intraperitoneal | 30 | ~1 |
| Oral | 75 | ~1 |
| Subcutaneous | 35 | ~4.5 |

In the chromatographic analyses of urines of the animals treated by the three administration routes, there have been found, in a measure which cannot be differentially appreciated from one route to another, a considerable amount of degradation products and especially a metabolite having a yellow-green fluorescence and a metabolite having an orange fluorescence after treatment with sulphuric acid. Comparison tests permit to exclude the presence of xanthylenes and the derivative which is demethoxylated in the $C_3$ position, at least in its free form.

(6) CLINICAL TESTS

Effect on the functional respiratory parameters (A) In anesthesia.—There have been evaluated the respiratory rate, the tidal volume, the arterial pressure and the ECG upon administration, by intravenous injection, of 50 mg. of the compound No. 1 during anesthesia and in the immediate post-anesthetic period in patients subjected to operations of small, medium and high surgery, anesthesized with different methods (halothane, methoxyflurane, neutroleptanalgesia). As comparison analeptics there have been used prethcamide (225 mg.), dimefline (8 mg.) and doxapram (50 mg.), under the same experimental conditions.

Table 5 reports the variations of the tidal volume, the time at which they first occur, their duration, and the variations in pulse rate and arterial pressure.

TABLE 5

| | Variations of the tidal volume | | | | |
|---|---|---|---|---|---|
| Compound | Increase, percent | Starting | Duration | Pulse rate | Arterial pressure |
| Compound No. 1 | 20 | 5'-6' | 20' | Unchanged | Unchanged. |
| Prethcamide | 24 | 3'-4' | 10' | Increased | Increased. |
| Dimefline | 17 | 10'-12' | 20' | Decreased | Unchanged. |
| Doxapram | 25 | 1'-2' | 12' | Increased | Increased. |

It can thus be seen that the compound No. 1 exerts an effect which is less intense, but more lasting, than that of prethcamide and doxapram but, in contrast with them, does not originate any substantial changes in the cardiocirculatory pattern. As compared with dimefline, the pneumokinetic action is more marked and earlier.

The compound No. 1, in addition, is devoid of any demonstrable awakening effect and does not interfere with the anesthetics used. Thus, at clinically active dosages, it has a specification action on the respiratory function, with favourable features as to intensity, starting time and duration, any unwanted side effects being lacking.

(B) In chronic pneumopathic patients.—There have been evaluated the pulmonar ventilation, oxygen consumption, carbon dioxide production, respiratory rate, arterial $pO_2$ and $pCO_2$, the arterial pressure and pulse rate prior to, and after several time intervals from its intravenous administration, both rapid and slow, after intramuscular injection of the compound No. 1.

Rapid intravenous injection. 100 mg. give rise to an average increase of ventilation of 18%. The respiratory stimulating effect starts within 5 minutes from the end of the injection and lasts about 15 minutes. Under the same test conditions, 16 mg. of dimefline cause an average increase of ventilation of 12%.

Concurrently with a more intense ventilation response (over 18%) and during a short period of time, both the consumption of oxygen and the production of carbon dioxide are increased. No significant changes have been recorded in the pulse rate or the systolic and diastolic arterial pressure.

Slow intravenous injection. 100 mg. in 100 ml. of saline, administered by slow infusion (15') in patients which had been treated intramuscularly one hour before with 0.1 g. of phenobarbital, give rise to an average increase of ventilation of 16%, which occurs after 10 minutes without variations of the respiratory rate or any side effects.

Intramuscular injection. 100 mg. administered to patients which had been treated intramuscularly one hour before with 0.1 g. of phenobarbital, give rise to an increase of ventilation which is significant (more than 10%): also significant are the increase of arterial $pO_2$ and the decrease of arterial $pCO_2$. These variations begin to occur 15 minutes after administration and last for at least one hour.

Local tolerability is perfect and no side effects have been recorded.

The embodiments of the invention which an exclusive property or privilege is claimed are defined as follows:

1. A method of preparing a compound having pneumokinetic activity comprising reacting an N-halogen succidimide with a 4-methyl 9-oxo-10-oxa-9:10 dihydroanthracene, which has been substituted in the 3-position by a substituent selected from the group consisting of —OH, —OCH$_3$, —Cl, —F, —CF$_3$, —NO$_2$, —NH$_2$, and —COCH$_3$, separating the N-succinimide from the halogenized reaction product and recovering it as a residue, condensing the halogenized reaction product with a secondary amine selected from the group consisting of dimethylamine, diethylamine, piperidine and morpholine, and reconstituting the N-halogen succinimide, and recycling it to the first stage of the method.

2. A method according to claim 1, characterized in that the first halogenizing reaction is carried out in hot conditions and in the presence of a catalyst.

3. A method acording to claim 1, wherein the substituent is —OCH$_3$.

References Cited

Arzneim-Forsch, vol. 18: 718–19, No. 6, June 1968, Da Re et al.

J. Indian Chem. Soc., vol. 41: 471–72, 1964, Agasimundin et al.

Chem. Abstracts, vol. 67: 53991 p., September 1967, Angodiyavar et al.

Can. J. Chem., 41: 1731–36, 1963, Mustafa et al.

Synthetic Organic Chemistry, Wagner et al., N.Y., John Wiley & Sons, Inc., 1953, p. 98.

HENRY JILES, Primary Examiner

S. D. WINTERS, Assistant Examiner

U.S. Cl. X.R.

260—294.7 C, 335; 424—248, 267, 283